G. L. McKNIGHT.
Calipers.
No. 64,240.
Patented April 30, 1867.
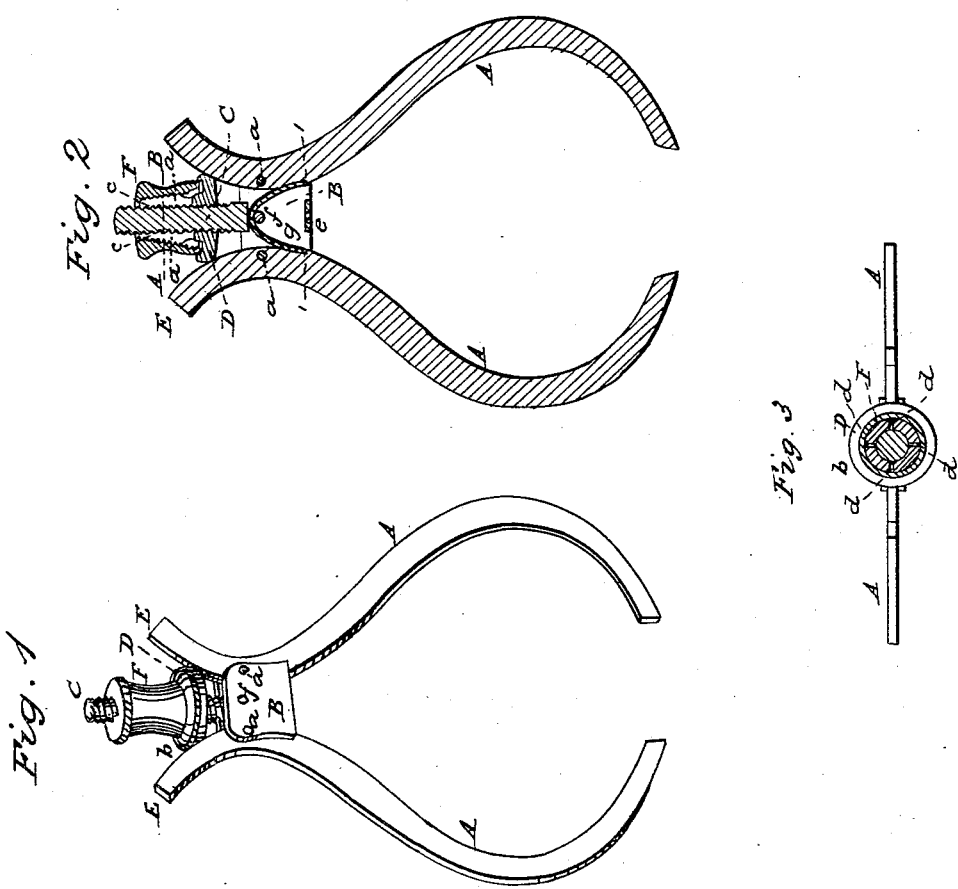
Witnesses:
Thos. H. Dodge
D. L. Miller
Inventor:
G. L. McKnight

United States Patent Office.

G. L. McKNIGHT, OF WORCESTER, MASSACHUSETTS.

Letters Patent No. 64,240, dated April 30, 1867.

---

IMPROVEMENT IN DIVIDERS AND CALIPERS.

---

The Schedule referred to in these Letters Patent and making part of the same.

---

KNOW ALL MEN BY THESE PRESENTS:

That I, G. L. McKnight, of the city and county of Worcester, and Commonwealth of Massachusetts, have made certain new and useful improvements in Calipers, Dividers, and other similar instruments; and I do hereby declare that the following is a full, clear, and exact description of the same, reference being had to the accompanying drawings, forming a part of this specification, in which—

Figure 1 represents a perspective view of a pair of calipers with my present improvements applied thereto.

Figure 2 represents a longitudinal central section of the device shown in fig. 1: and Figure 3 represents a cross-section on line A B, fig. 2.

In the drawings, the parts marked A A represent the arms or forks of a pair of calipers. These arms A A are hinged at $a$ $a$ in the slotted body-piece B, which has a standard or screw, C, projecting up from its top, as shown in the drawings, and upon which a nut, D, works, the lower part or head of which is made with a projection $b$, which bears against the upper curved ends E E of the arm A A. The upper part $c$ of nut D is made tapering, and is also slotted as shown at $d$, figs. 2 and 3. It is also provided with a screw-thread on its outer surface to fit the thread in the nut F. Nut F, when screwed down as shown in the drawings, compresses the slotted end of the nut D upon the screw or standard C, and binds the two so securely together that there is no liability of nut D turning upon screw C until nut F has been loosened. The upper side of the projection $b$ is grooved or recessed out so that when nut F is turned down the lower edge will fit into the groove, as fully shown in fig. 2, and thus prevent all dust and dirt from working in between the nuts. The body or part B is recessed or cored out in the middle as indicated in fig. 2, the sides being joined at the top by the screw or standard part C, and also at the bottom by a narrow rib, $e$. Just below the bottom of the standard or screw C, a pin, $f$, is passed through to support a spring, $g$, the ends of which are bent down to act upon the arms A and expand them. Arms A A are so formed as to have shoulders, 1 1, to prevent spring $g$ from working out of place. In case the spring $g$ works to one side, it is arrested by its end striking against the shoulder 1 on the arm on that side.

The operation is as follows: The operator turns nut F up and thereby loosens nut D, which he then turns down, if the points of the arms are to be set nearer together, or up if they are to be set further apart. As soon as the desired position of the arms A is obtained, nut F is turned down, thereby closing the slotted end of nut D upon screw C, so that the parts are not liable to become displaced or changed by mere use, handling, or dropping. The calipers may be so made that inside surfaces, as well as outside surfaces, can be calipered. The screw-thread, either on screw C or nut D, may be cut left-handed, if preferred, and a separate spring may be employed to expand or open such arm.

Having described my improvements in calipers, dividers, and other similar instruments, what I claim therein as new and of my invention, and desire to secure by Letters Patent, is—

1. The combination, with the arms of calipers or dividers, of the screw C, slotted nut D, and tightening nut F.

2. The combination, with the curved ends E E of arms A, of the slotted nut D and tightening nut F, substantially as and for the purposes set forth.

3. The combination, with arms A, having shoulders 1 1, of spring $g$, substantially as and for the purposes set forth.

4. The combination of nut D with the curved ends E E of arms A A, for the purpose of adjusting the arms, substantially as set forth.

G. L. McKNIGHT.

Witnesses:
Thos. H. Dodge,
D. L. Miller.